United States Patent [19]

Barton

[11] 4,146,220
[45] Mar. 27, 1979

[54] DOCUMENT HANDLING APPARATUS

[75] Inventor: Peter Barton, Sling Near Coleford, England

[73] Assignee: Xerox Corporation, Stamford, Conn.

[21] Appl. No.: 780,893

[22] Filed: Mar. 24, 1977

[30] Foreign Application Priority Data

Jun. 25, 1976 [GB] United Kingdom ............... 26581/76

[51] Int. Cl.² .......................... B65H 9/04; B65H 5/02
[52] U.S. Cl. ................................... 271/233; 271/275; 271/DIG. 9
[58] Field of Search ............ 271/233, 4, 275, DIG. 9, 271/3, 6, 7, 10, 245, 246; 355/75, 76

[56] References Cited

U.S. PATENT DOCUMENTS

| 3,790,158 | 2/1974 | Summers et al. | 271/4 |
| 4,043,550 | 8/1977 | Phillips et al. | 271/233 |

Primary Examiner—Bruce H. Stoner, Jr.

[57] ABSTRACT

A sheet handling apparatus in which sheets are automatically moved in sequence into a registered position on a work surface and then moved out of that position to make way for the next sheet is disclosed. The sheet handling apparatus includes a sheet transport for conveying a sheet over a receiving surface and including a drive surface engageable with a sheet on the surface, and a spring supported roller and stop arrangement for automatically varying the frictional engagement between the drive surface and a sheet on the receiving surface.

3 Claims, 6 Drawing Figures

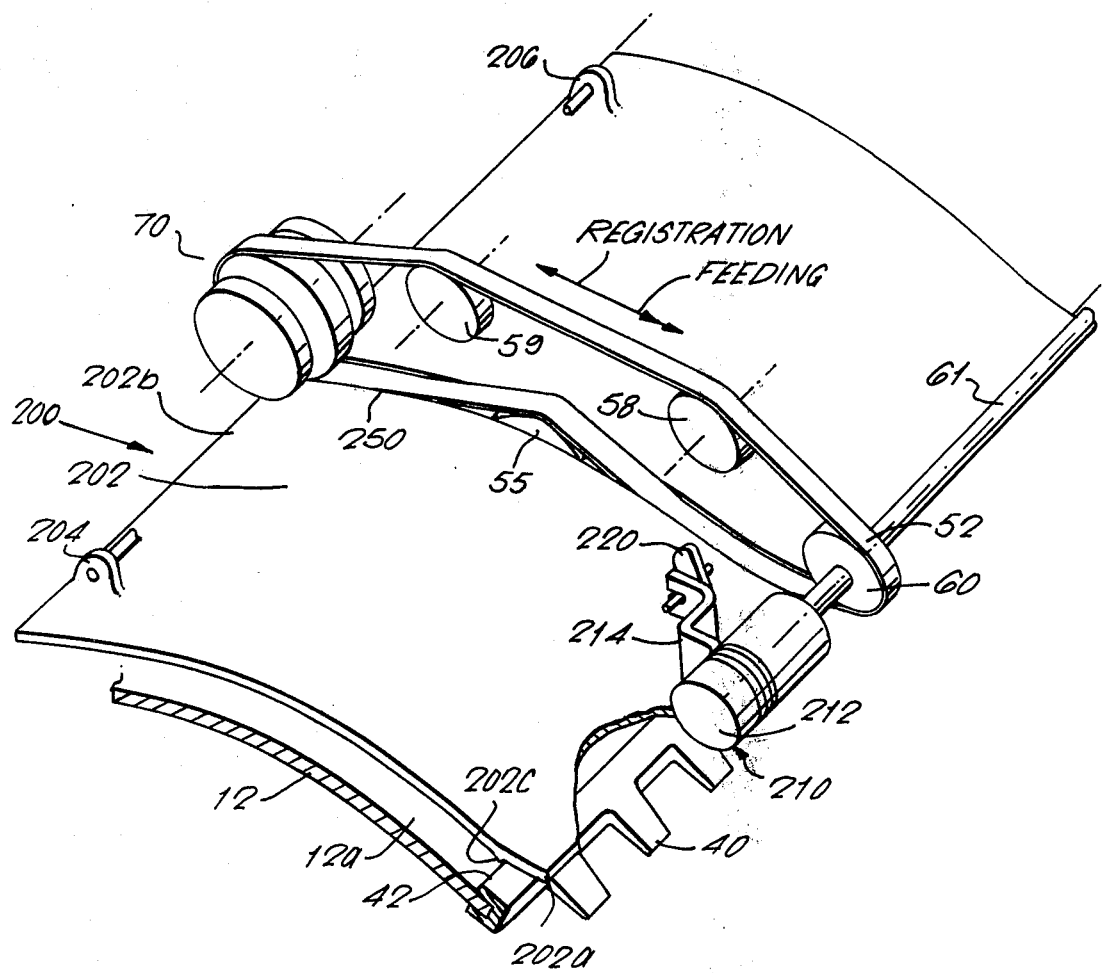

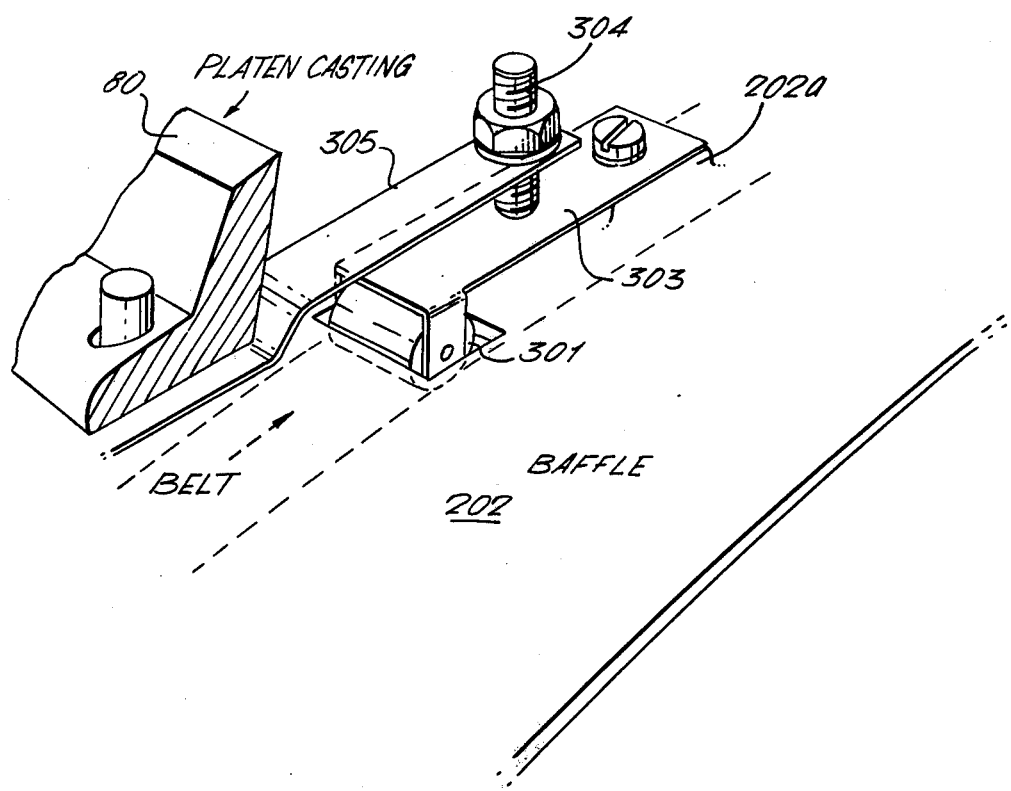

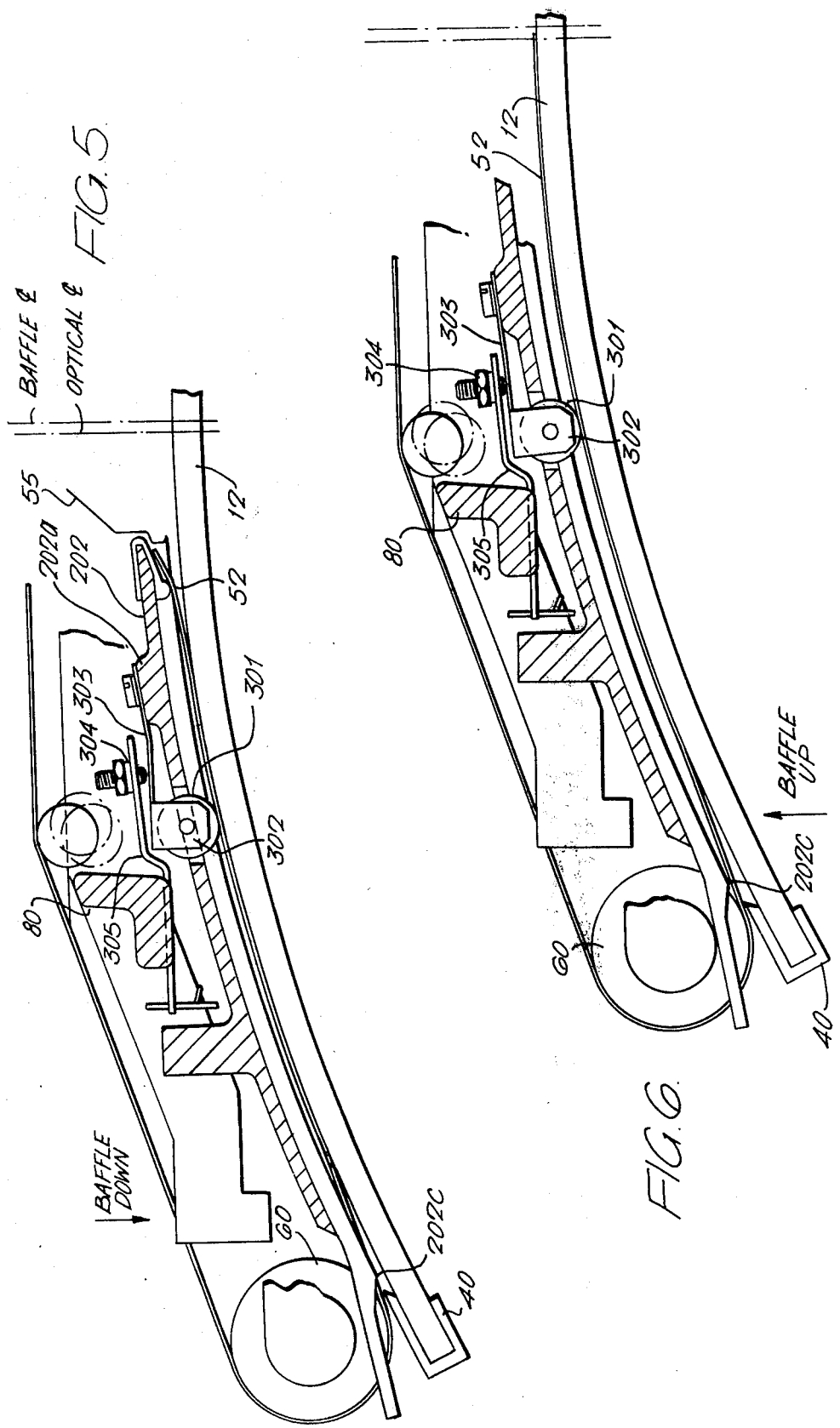

DOCUMENT HANDLING APPARATUS

BACKGROUND OF THE DISCLOSURE

I. Field of the Invention

This invention relates to sheet handling apparatus particularly for use in copying machines. More particularly, the invention is concerned with such apparatus in which sheets are automatically moved in sequence into a registered position on a work surface and then moved out of that position to make way for the next sheet.

II. Description of the Prior Art

Quick and accurate movement of documents to a registered predetermined location and removal of these documents is important in the processing of sheet material as for example in the environment of a copying machine. Thus, in a copying machine, an automatic document handler should not only rapidly move the document onto a platen, but must accurately register that document in a specific predetermined copying position or area to assure the production of a complete and visually acceptable copy. If the document is situated on the platen in a skewed or misaligned position within the area, the copy will reflect this same skew or misalignment and may be incomplete and/or unacceptable to the user. If the original is wrinkled, torn or creased it may not produce good copies and will not be acceptable to the user for a great number of reasons, not the least of which may be unsuitability for subsequent use in a machine or automated processor. Moreover, the automated handler must be able to perform these functions efficiently with a maximum range of paper or material weights as documents copied may vary from light weights such as what is known as "onion skin" in the order of 50 grams per square meter to much heavier weights in the order of 120 grams per square meter.

In order to reduce the incidence of skew it has previously been proposed to register the document against a stop, the document being driven over the platen surface by a belt drive. Particularly good results have been achieved by apparatus as proposed in copending Application Ser. No. 687,062, filed May 17, 1976, now U.S. Pat. No. 4,076,233, and assigned to the same assignee as the present application, in which the belt is narrow relative to the surface and is generally centrally located over the surface whereby in operation the belt engages a generally centrally located portion of a document to move the latter over the surface.

One way of registering a document is to feed the document onto the platen surface and then reverse the document against a stop at the inlet end of the platen surface. This is particularly convenient where the document is ejected at the opposite end of the platen since the stop can readily be arranged so as not to interfere with the document as it is fed onto the platen and thus the stop need not be retractable.

In order to ensure that the document is properly registered it is proposed in copending Application Ser. No. 687.059, filed May 17, 1976, now U.S. Pat. No. 4,043,550, and assigned to the same assignee as the present invention to arrange a baffle over the platen, the baffle being positioned against the registration stop during document registration and raised during entry to the platen of a document and removal of the document therefrom. Further, to permit complete and accurate registration of the document, the belt should desirably be able to slip over the document, even if only for a moment, once the document has engaged the stop. In order to achieve this while providing that the drive positively engage the document to drive it onto and off the platen, it has been proposed in copending Application Ser. No. 687,061, filed May 17, 1976 and assigned to the same assignee as the present invention to reduce the frictional engagement of the belt with the document during document reversal as compared with document advance. A preferred mode of achieving this is described wherein a roller acts on the belt. The roller is mounted on an axle having its opposite ends journalled in inclined slots. When the belt is driven to advance a document on the platen, the axle ends roll down the slots to increase the pressure of the belt on the document. On the other hand, when the belt is reversed to register the document against the stop, the axle ends ride up the slots to reduce the pressure.

SUMMARY OF THE INVENTION

The above described arrangement is only suitable for use where the document drive is reversed during registration. It is an object of the present invention to provide for the drive pressure to be varied independently of the direction of drive.

To this end the invention consists in, from one aspect, sheet handling apparatus including a sheet transport for conveying a sheet over a receiving surface and including a drive surface engageable with a sheet on the surface, and means for automatically varying the frictional engagement between the drive surface and a sheet on the receiving surface. In one embodiment a stop is provided for registering the sheet in a desired position and said frictional engagement is varied during registration.

We have found that a baffle as described hereinabove may be utilized to effect the automatic adjustment of this invention and to this end the invention consists in, from another aspect, sheet handling apparatus including a sheet transport for conveying a sheet over a receiving surface and including a drive surface engageable with a sheet on the surface, a baffle overlying the receiving surface and movable towards and away from the surface between a first, raised position and a second, lowered position, and means urging the drive surface against a said sheet with a greater force in the first position of the baffle than in the second position of the baffle.

BRIEF DESCRIPTION OF THE DRAWINGS

In order that the invention may be more readily understood, reference will now be made to the accompanying drawings, in which;

FIG. 3 is a schematic perspective view showing a baffle overlying the platen;

FIG. 4 is a partial section showing means according to this invention for adjusting belt pressure and with the baffle lowered;

FIG. 5 is a view similar to FIG. 4 but showing the baffle raised; and

FIG. 6 is a perspective view of the belt pressure adjustment means.

DESCRIPTION OF THE PREFERRED EMBODIMENTS

Figure 1:
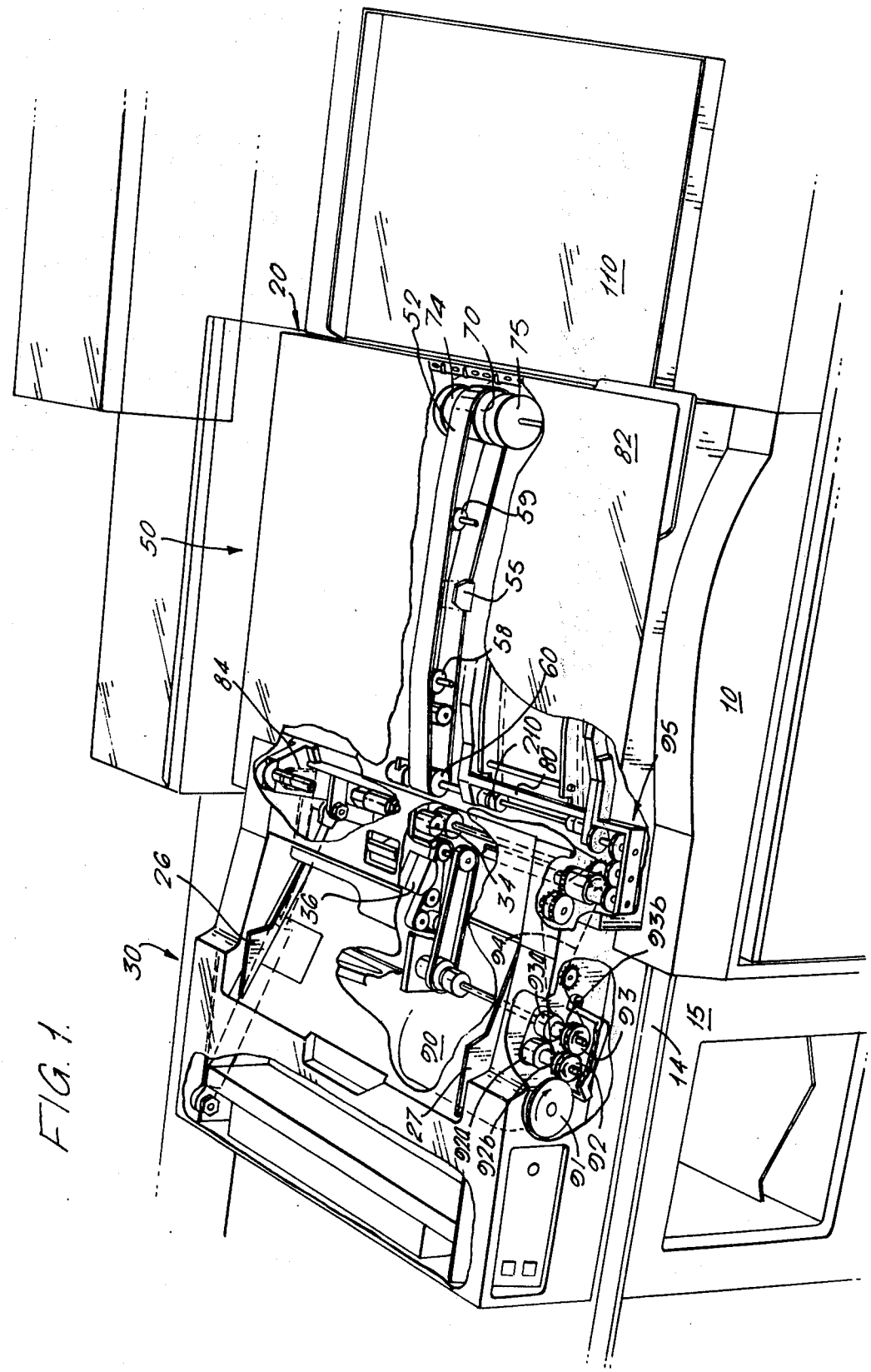
FIG. 1 is a perspective view of a document handling apparatus in position on the platen of an electrostatographic copier with parts of the apparatus broken away to show greater detail.
Figure 2:
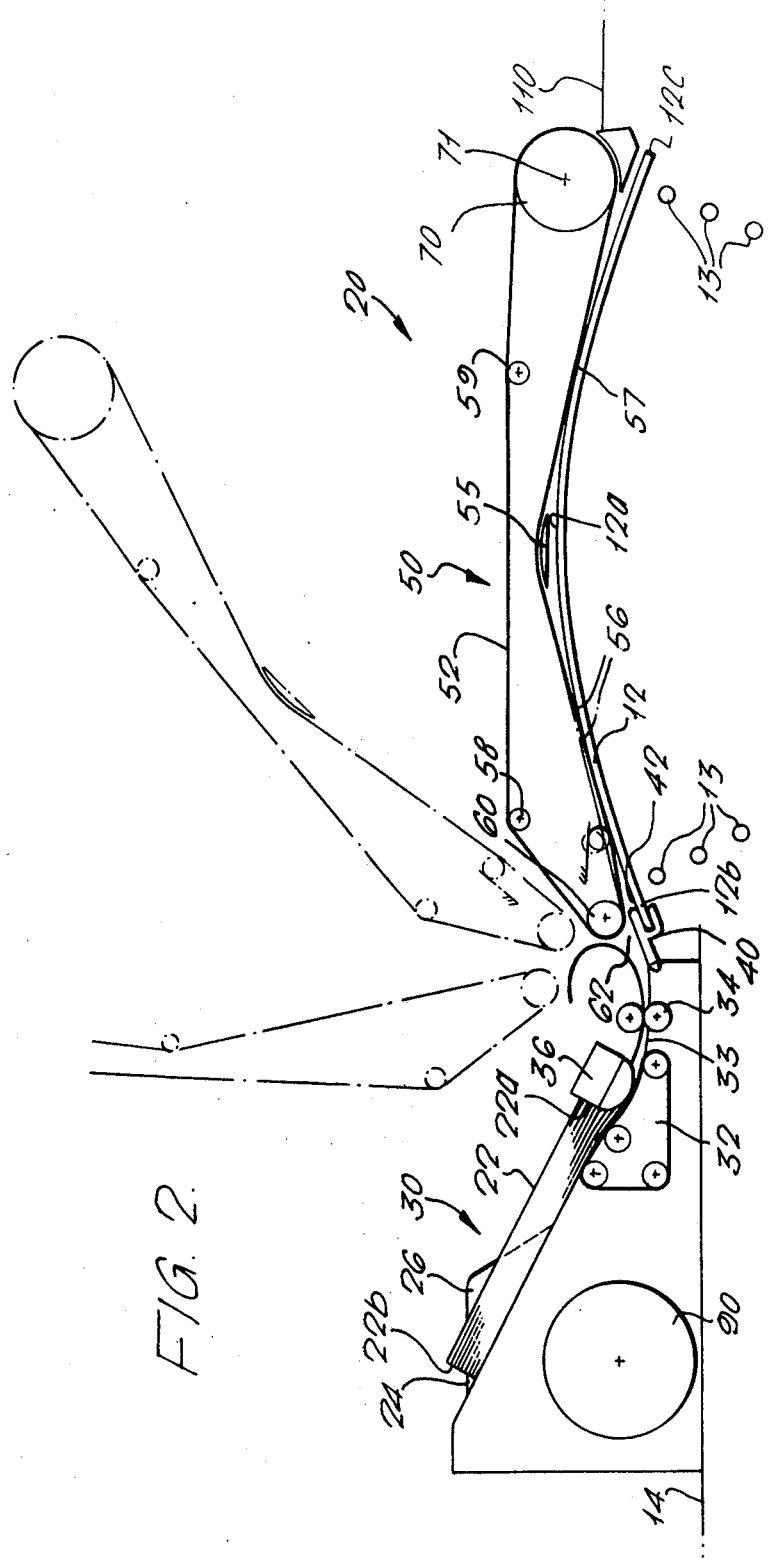
FIG. 2 is a schematic cross-section of the apparatus of FIG. 1.

Referring to FIGS. 1 and 2 of the drawings there is shown a portion of an automatic electrostatic reproduction machine 10 of the kind disclosed for example in U.S. Pat. No. 3,301,126 including a document handling apparatus 20 in accordance with the invention. The document handler 20 overlies a work station comprising an exposure area or platen 12 of the machine 10 and extends over an upper suface 14 of a document output or sorter extension 15 of the machine. The document handler 20 is synchronized with the control of the machine 10 automatically to feed seriatim documents to be copied to the platen 12, register each document and hold it in position on the platen until a selected number of copies has been produced by the machine 10 and then remove it from the platen while feeding the next document to be copied. One method of producing the copies by the machine 10 will be understood for example by reference to the above mentioned U.S. Pat. No. 3,301,126 from which it will be seen that the platen 12 is illuminated from below as suggested by the lamps 13 in FIG. 2 and the image on an upper surface 12a of the platen reflected on to a photoconductive surface (not shown) where the image is developed and from which it is transferred to a suitable substrate to produce the copy.

Document handler 20 generally comprises a sheet material feeder 30 and a document transport 50. The feeder 30 includes a supply tray 24 for cut-sheet documents, and a sheet separator mechanism 32 and a pair of advancing or pinch rolls 34 by which the documents are fed one at a time from a stack of documents in the tray 24 to the document transport 50.

For specific details of an embodiment of a sheet separator 32 which has been found to perform particularly well in this environment reference may be made to copending U.S. Application Ser. No. 687,058, filed on May 17, 1976, now abandoned, and assigned to the same assignee as the present application.

In operation, documents 22 which may be ordinary cut sheets of paper having generally parallel and straight forward and rear edges 22a, 22b respectively, are placed face down for copying in the inclined tray 24 so that the forward edge 22a of the documents will be held normal to the direction of document travel by a suitable restraining member 36.

The alignment of documents by the document feeder 30 relative to the exposure station 12 is preferably such that the center line of the documents remains at generally the same position regardless of the width of the document. This alignment is provided in this embodiment by a pair of self-centering side guides 26 and 27 on opposite sides of the supply tray 24 which restrain the side edges of the documents generally parallel to the direction of feed and feed documents from a central area of the stack or pile regardless of the width of the stack.

With the documents in place and the processor 10 set to make the required number of copies of each document 22, automatic operation is initiated by activation of the "start-print" control of the processor 10.

From its position on the bottom of the document pile in tray 24 the first document is separated from the remainder of the stack by the separator 32 and fed forward over a guide 33 so that its forward edge 22a enters the nip of the driven pinch rolls 34 which latter pull the document 22 completely from the tray and move its forward edge 22a over a registration member 40 and under the control of the transport 50.

The document transport 50 comprises an endless belt 52 riding over and extending between rollers 60 and 70. The belt 52 is driven via the roller 60 which may be rotated in two directions. Anti-clockwise rotation of roller 60 drives the belt "forwards" to advance a document across the platen 12. Clockwise rotation "reverses" the belt for registering the rear edge of a document against the registration member 40. The rollers 60 and 70 rotate on shafts 61 and 71 respectively which are mounted on a movable frame 80 located centrally along opposite sides 12b and 12c of the platen upper surface 12a so that the belt entrained thereover extends across the central portion of the platen or processing station 12. The belt itself is narrow relative to the platen as proposed in copending U.S. Application Ser. No. 687,062, filed May 17, 1976, now U.S. Pat. No. 4,076,233, and assigned to the same assignee as the present application. The frame 80 supports a suitable outer cover 82 which hides the moving parts and prevents light from entering the platen 12.

Advantageously the roller 60 is of small diameter (e.g., 1.5 inches) so that a nip 62 between the belt 52 entrained thereover and the platen surface 12a may be as close as necessary to the edge 12b of the platen and to the paper feeder 30. The belt 52 rests on the platen surface 12a and is made of a material such as silicon rubber on a flexible backing and is preferably white on its outer surface and has a high coefficient of friction with paper type materials, e.g., 1.0–1.5. The platen surface 12a will usually be smooth glass so that its coefficient of friction with the paper or belt is relatively low e.g., less than 0.1. Consequently, a document in the form of a material with a relatively high coefficient of friction such as paper for example, will be effectively gripped by the belt 52 on its upper side when it is fed into the nip 62 and caused to slide over the surface 12a on its lower side under the control of the belt 52.

A schematic illustration of how the transport 50 moves out of position to allow access to the platen area 12 for manual use or cleaning is set forth by the dotted lines in FIG. 2 which show the mechanism in a generally half open position and also in a fully open position. As may be understood from FIG. 1 the frame means 80 pivots about an axis 84 that is spaced above the platen 12 to allow full opening extending the frame 80 upwardly about ninety degrees.

A hitch 55 from the belt 52 is positioned on the outside of the belt 52 to support the belt above the platen 12 at an intermediate point between the rollers 60, 70 so that the belt contacts the platen surface 12 at two separated contact areas 56, 57 spaced along its length, i.e., in the direction of travel of the belt. Preferably, as shown, the intermediate point is generally halfway between the rollers.

Idler rollers such as shown at 58, 59 may be provided as required at other positions along the length of the belt means 52. These may be positioned to adjust belt tension.

Registration member 40 functions to align documents in a predetermined relationship and extends along platen edge 12b. Member 40 is arranged so that documents being fed toward the platen 12 in a first direction pass smoothly thereover; however, it includes an edge 42 raised above the surface 12a so that once a document has passed thereover and is moved in reverse direction, a trailing edge 22b of the document held against the surface 12a will abut thereagainst. Registration member 40 is preferably in the form of a generally channel-shaped plastics clip which fits over the edge of the platen glass 12 as described more fully in copending Application Ser. No. 780,890, filed concurrently herewith, entitled "Document Handling", and assigned to the same assignee as this application. A baffle member 200 may be provided, as set out in copending Application Ser. No. 687,059, filed May 17, 1976, now U.S. Pat. No. 4,043,550 and assigned to the same assignee as the present application, to assure proper abutment of the document edge against the registration surface 42. As is known from U.K. Pat. No. 1,122,626 suitable indicia may be provided on the registration member to allow manual alignment of documents when the machine is being used in a manual mode.

By using a narrow belt 52 with crowned rollers 60, 70 construction is greatly simplified in that no side guides are required and tracking problems are greatly reduced compared with a wide belt. We have found that a narrow belt of greater than a 35-1 length to width ratio tracks very well without any guides and does not tend to cause the document to skew.

Operating the belt 52 in a stable condition on crowned pulleys or rollers 60, 70 without edge guides eliminates belt edge wear and possible detracking which may occur under unstable conditions. Accordingly, maintenance is minimized. The roller 60 may advantageously be rubber tyred to improve traction.

Ejection of documents from the platen 12 is initiated by the belt 52. However, the final push on to an output tray 110 is assisted by a pair of ejection rollers 74, 75 which are coaxial with the second roller 70. The pair of ejection rollers avoid skewing the document during ejection to provide a neat readily collectable output.

The baffle 200 includes a member generally indicated at 202 overlying the processing station 12 and extending on opposite sides of the belt 52. The member 202 has a first edge portion 202a overlying the registration member 40 and a second, opposite edge portion 202b, pivotally mounted to the frame 80 by means of hinge portions 204 and 206. The portion 202a of member 202 is movable into and out of operative engagement with the registration member 40 by a lift mechanism generally indicated at 210 that is connected with a drive shaft 61 for the transport roller 60 through a clutch 212.

The clutch 212 transmits a portion of the rotary motion of the drive 61 in the direction indicated by the labelled arrow during feeding drive to a lift arm 214 that contacts with a bracket 220 on the baffle to pivot the latter upwardly and raise edge portion 202a above member 40. In this raised position a sheet of material may pass under the baffle and over the registration member 40 onto the surface 12a. When the drive reverses to move the belt in the registration direction as indicated by the labelled arrow, the clutch pivots arm 214 downwardly to move the baffle tight against the member 40 thereby causing the trailing edge 22b of document 22 to abut the edge 42 and preventing its movement therepast.

As shown, the baffle 202 has a guide ridge portion or lip 202c to urge the document edge against the lower portion of the registration edge 42. In the schematic of FIG. 5 the baffle is in two parts separated by an opening 250 which allows the narrow belt 52 to pass into contact with the platen surface 12a; however, a single piece baffle member 202, with suitable apertures for the belt may equally be used.

The baffle is generally uniformaly spaced above the platen surface 12a as indicated in FIG. 5 and in practice we have found a spacing of 0.035 to 0.050 inches to provide excellent results by allowing adequate room for a wide thickness range of sheet material to move freely and yet small enough to prevent undesirable buckling and creasing of thin sheets, even under conditions of high humidity.

Power to drive the paper feeder 30 and the belt transport 50 is supplied by a motor 90 which may advantageously be located under the document tray 24. Rotary motion is transmitted from the motor drive gear 91 to a pair of counter rotating gears 92, 93 which in turn are each connected via clutches 92a, 93a to chain drive sprockets 92b, 93b respectively whereby alternate engagement of the clutches will transmit counter-clockwise or clockwise rotation respectively to a chain drive 94. A clutch surface between the gears 92, 93 and sprockets 92b, 93b, is engaged or disengaged by a clutch which is electrically energized in response to machine control logic. The chain drive 94 in turn causes the pinch rolls to drive intermittently and a series of interconnected gears generally indicated at 95 alternately to drive axis 61 and the first roller 60 in opposite first and second directions.

In operation, as the sheet feeder 30 begins to separate and feed a document 22, the platen baffle 200 is raised to open a document entrance gap below it and above the registration member 40 so that documents advanced by the pinch rolls 34 will enter the gap. When the pinch rolls 34 pass the forward or leading edge 22a of a document toward the nip 62 of the document transport 50 a sensing switch located between them is tripped which causes a trailing edge 22b of the document to be detected after which by a small delay the baffle 200 is caused to close against member 40 and the belt 52 is caused to reverse to the second direction. The reverse movement of the belt is timed to allow the trailing edge to abut the registration surface 42 and cause the belt 52 to slip over it briefly to assure full registration and correction of any skew.

Closure of the baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off the copy will not, in most cases of 1:1 copying onto document sized paper, include all of the original document. Even where document margins are such that essential information would not be lost as a result of misregistration nevertheless the aesthetics and integrity of copy would be severly reduced in the eyes of a reader.

After the document has been registered the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

We have found that while a high frictional force between the belt 52 and the document 22 is desirable when the belt 52 is moving in the first direction to convey the document onto the platen surface 12a or to eject it therefrom this high frictional force is a disadvantage when registering the document against the stop member 40 because during registration slippage must easily occur between the belt and the document if skew is to be properly corrected. This presents a dilema between keeping the force of the belt high enough to prevent slip in the first instance when pulling the document onto the platen and moving it off, yet low enough in the second instance so that slip will occur during registration.

In accordance with the present invention, the frictional engagement between the belt 52 and document 22 is varied automatically so that a lesser frictional force is exerted on the document registration, which in the embodiment described corresponds to reversal of the belt drive, than during advancing movement of the document from the platen. This is accomplished by varying the frictional engagement in dependence upon the position of the baffle 200.

The automatic adjustment is effected by varying the belt-to-document pressure by means of a pressure roller 301 which acts against the rear or upper surface of the belt 52. The roller 301 is an idler roller journalled in a mounting 302 supported from the baffle member 202. The mounting is connected to a rib 202a, which extends between the two baffle parts across the opening 250, by a spring plate 303. A stop member 304 mounted on a plate 305 carried from the platen cover frame 80 is arranged over the spring plate 303. The stop 304, which is adjustable towards and away from the plate 303, is arranged so that as the baffle is raised (FIG. 6) during document advancing movement, the pressure roller 301 is urged with greater force against the belt 52 than when the baffle is lowered (FIG. 5) during document registration. This is achieved by arranging the stop 304 above plate 303 intermediate mounting 302 and rib 202a so that as the rib 202a rises, the plate 303 pivots about the stop and presses more firmly against the belt 52. As shown in FIG. 5 the stop 304 may be out-of-contact with the plate 303 when the baffle is lowered, although it may engage the plate into this position if desired.

Although a preferred embodiment of the invention has been described it will be understood that various modifications may be made without departing from the scope of the claims. For example, two or more parallel narrow belts may be used in place of the single belt described.

While the preferred embodiment described has included a curved platen it will be understood that a flat platen or other processing station configuration may be used instead. Moreover, it will be understood that the terms — "platen" and "exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

Further, while the invention has been described with reference to apparatus in which documents are registered by reversing the document motion, it is to be understood that the invention is equally applicable to apparatus in which the direction of document motion is not altered for registration or in which a change of direction through 90° is effected.

I claim:
1. Sheet handling apparatus including
a sheet transport for conveying a sheet over a receiving surface, said sheet transport including a drive surface comprising a belt engagable with a sheet on said receiving surface;
a baffle overlying the receiving surface and movable towards and away from the receiving surface between a first, raised position and a second, lowered position;
and means for urging the drive surface against said sheet with a greater force in the first position of the baffle than in the second position of the baffle, wherein said urging means includes a roller connected to the baffle by a spring plate and a stop arranged to engage said spring plate at a location between the roller and the connection of the spring plate to the baffle as the baffle is raised so as to urge the roller against the belt.
2. Apparatus according to claim 1 wherein the belt is endless and the receiving surface is the platen of a photocopier having a registration stop along one edge which stop is engaged by said baffle in the second position of the baffle.
3. Apparatus according to claim 1 wherein the drive surface is alternately movable in opposite first and second directions, the baffle being raised during movement of the drive surface in the first direction and lowered during movement of the drive surface in the second direction.

* * * * *